(12) United States Patent  
Sawada et al.

(10) Patent No.: US 8,454,235 B2  
(45) Date of Patent: Jun. 4, 2013

(54) RADIOGRAPHIC IMAGING SYSTEM

(75) Inventors: Hirofumi Sawada, Ashigara-kami-gun (JP); Minoru Takami, Ashigara-kami-gun (JP); Yasunori Ohta, Ashigara-kami-gun (JP); Noriaki Ida, Ashigara-kami-gun (JP); Akiko Kanagawa, Ashigara-kami-gun (JP); Daiki Harada, Ashigara-kami-gun (JP); Satomi Yamada, Ashigara-kami-gun (JP); Ryo Ono, Ashigara-kami-gun (JP); Naoki Mochizuki, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 259 days.

(21) Appl. No.: 13/070,216

(22) Filed: Mar. 23, 2011

(65) Prior Publication Data

US 2011/0240872 A1  Oct. 6, 2011

(30) Foreign Application Priority Data

Mar. 31, 2010 (JP) ................................. 2010-080399  
Sep. 28, 2010 (JP) ................................. 2010-217188

(51) Int. Cl.  
*A61B 6/08* (2006.01)

(52) U.S. Cl.  
USPC ........................................... 378/205; 378/95

(58) Field of Classification Search  
USPC .................. 378/62, 91, 95, 98, 196, 197, 205  
See application file for complete search history.

(56) References Cited

U.S. PATENT DOCUMENTS

2003/0095636 A1* 5/2003 Ogura et al. .................. 378/205  
2007/0297563 A1* 12/2007 Shinden ......................... 378/19  
2011/0164724 A1* 7/2011 Ohta et al. ..................... 378/62

FOREIGN PATENT DOCUMENTS

| JP | 2000-333936 A | 12/2000 |
| JP | 2005-184750 A | 7/2005 |
| JP | 2009-207527 A | 9/2009 |

* cited by examiner

*Primary Examiner* — Hoon Song  
(74) *Attorney, Agent, or Firm* — Sughrue Mion, PLLC

(57) ABSTRACT

A radiographic imaging system includes an imaging apparatus which takes a radiographic image of a subject and outputs image data of the radiographic image; an image processing apparatus which performs image processing of at least one of an exposure field recognition process and a trimming process on the image data of the radiographic image; an image processing information storage apparatus which stores the imaging conditions of the radiographic image and image processing information which indicates the image processing and its applicable range in an associated manner; and an image processing information search apparatus which searches for image processing information according to imaging conditions of current imaging, among the image processing information of past imaging stored. The imaging apparatus changes a range of radiation exposure irradiated from a radiation source in accordance with the applicable range of the image processing of the past imaging contained in the image processing information retrieved by the image processing information search apparatus.

20 Claims, 6 Drawing Sheets

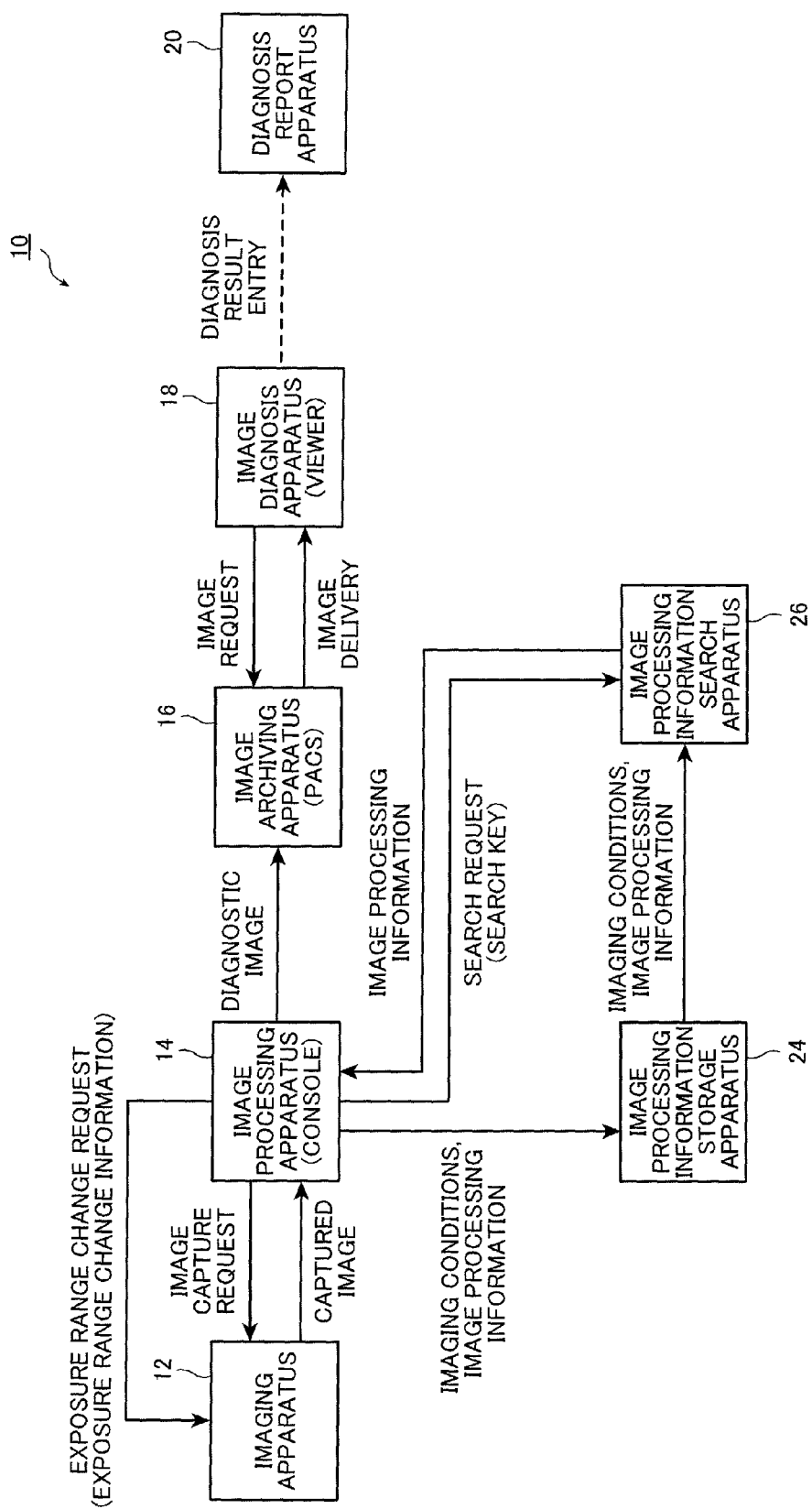

IMAGING RANGE
EXPOSURE FIELD REGION

TRIMMED REGION

RADIOGRAPHIC IMAGING SYSTEM

BACKGROUND OF THE INVENTION

The present invention relates to a radiographic imaging system which creates image data of diagnostic images by performing at least one of an exposure field recognition process and trimming process on image data of radiographic images taken of a subject.

As diagnostic images for physicians, radiographic images taken by irradiating a subject (patient) with radiation (X rays, α rays, β rays, γ rays, electron beams, ultraviolet rays, etc.) are widely used. Currently, radiographic imaging systems for medical treatment, which capture a radiographic image, perform image processing and process displaying and so forth digitally, are being put into practical use due to an increased use of CR (computed radiography) and DR (digital radiography) radiographic imaging systems.

A radiographic imaging system comprises, for example, an imaging apparatus which captures a radiographic image of a subject and outputs its digital image data, an image processing apparatus which performs image processing on the radiographic image that was taken, and an image diagnosis apparatus which displays the radiographic image after image processing, etc. These imaging apparatus, image processing apparatus and image diagnosis apparatus are, for example, located in different locations in a hospital, and are connected to each other via a network.

Image data of a radiographic image of a subject taken by the imaging apparatus is output from the imaging apparatus and input into the image processing apparatus via the network, where it undergoes image processing by the image processing apparatus. After that, when a physician is making a diagnosis, image data after image processing is output from the image processing apparatus and input into the image diagnosis apparatus via the network, and displayed on the image diagnosis apparatus. Diagnosis by a physician is performed by looking at diagnostic images displayed on the image diagnosis apparatus.

Incidentally, when taking a radiographic image, if a range of radiation exposure (exposure field) is inappropriately large, a diagnostic image having an image area of an appropriate size is created by performing a trimming process in the image processing apparatus when the image is checked after being taken.

However, since the next radiographic image will be taken with the same inappropriately large range of exposure (if a person taking an image and a person checking an image are different people, it may not be noticed that the range of radiation exposure is inappropriately large), trimming process must be implemented each time an image is checked. There is also a problem that it takes time to process a large image before it is trimmed.

Conversely, if the range of radiation exposure is set to be inappropriately small, there is a problem that if an image region required in diagnosis is not included in the radiographic image after being taken, the image must be retaken, thereby increasing the burden on a patient and reducing trust in a medical facility.

Also, even if the image region is optimally set by trimming process, it is used only during the trimming process, and those results are not used when taking images. As a result, the range of radiation exposure must be separately adjusted each time.

As described above, when taking radiographic images, the range of radiation exposure must be adjusted each time and trimming process of the radiographic image after being taken must be performed each time. As a result, there is a problem that the burden on the technician taking the radiographic images is extremely large.

Also, when it is desired to take images of the same site of the same patient at the same position each time over the course of time, as in follow-up examinations, normally the images are taken while positioning the same imaged site of the patient at the same position, at the same distance and at the same radiation dose.

However, there are cases where imaging at the same position as the previous time is not possible, and the image is taken at a position as close to the same position as possible, due to reasons such as a normally-used radiographic imaging system being unusable for only a certain imaging session, or an inability to twist the patient's body for positioning due to back pain, for example. In this case, the imaged site of the patient may be imaged obliquely in the radiographic images taken at that time, due to the arrangement of a radiation detector or a position of the patient when imaged, etc.

Here, the imaged site of the patient being imaged obliquely (also stated as "image taken with the patient tilted" hereinafter) means that the imaged site of the patient imaged in radiographic images during a certain session is tilted with respect to the same imaged site of the patient in the same position taken in radiographic images taken previously, in the case where it is desired to take images of the same site of the same patient at the same position each time over the course of time, as in follow-up examinations as described above.

When images cannot be taken at the same position as in past images, one may also consider postponing imaging and rotating the imaged site or the radiation detector so that the patient is imaged in the same position.

When trimming a radiographic image taken with the patient tilted (refer to FIG. 7A), one may consider, for example, correcting the tilt by rotating the radiographic image in a direction opposite the tilt so that the patient is straight on (refer to FIG. 7B), and trimming the radiographic image after correction (refer to FIG. 7C). In this case, the trimming process is performed by specifying a rectangular region whose sides extend in a horizontal direction and a vertical direction (dotted line A in FIG. 7C). Therefore, although a size of a trimmed region is nearly the same, there is a problem that image quality is degraded because an interpolation process is performed between pixels by the rotation process.

On the other hand, when trimming a radiographic image taken with the patient tilted (refer to FIG. 8A), one may consider tilting the rectangular trimmed region in the direction of tilt of the patient (rotating the trimmed region around an axis extending in a vertical direction on a display surface of the radiographic image, in accordance with the tilt of the patient) (refer to FIG. 8B). In this case, since rotation of the radiographic image is unnecessary, image quality is not degraded, but it is difficult to specify the region to be trimmed. An actual trimmed region is the smallest rectangular region that includes the tilted trimmed region (dotted line A of FIG. 8C) and whose sides extend in the horizontal direction and vertical direction (solid line B of FIG. 8C), and therefore the trimmed region becomes large.

Prior art references relevant to the present invention are JP 2009-207527 A, JP 2000-333936 A and JP 2005-184750 A.

In JP 2009-207527 A, it is described that in the case where a subject was imaged in the past with the same imaging menu as the current imaging, positions of a radiation tube and a radiation detector and so forth are determined based on information that indicates the most recent position, etc.

In JP 2000-333936 A, it is described that a region outside an exposure field, that is, a region from an edge of a captured image to a side edge of each shielding plate, is determined from position information of each shielding plate of an X-ray aperture and so forth, and a blackening process is performed.

In JP 20005-184750 A, it is described that a relative position of an area of concern for each imaged site is stored, and when imaging the same site, an imaging process is performed using characteristic values of a region corresponding to the relative position.

SUMMARY OF THE INVENTION

In JP 2009-207527 A, an effort of performing positioning in follow-up examinations can be reduced, because imaging can be performed at the same position as past imaging. However, because this is only position history, a size of the captured image (setting of a range of radiation exposure or a size of a radiation detector and so forth) must be adjusted each time.

In JP 2000-333936 A, an appropriate regions can be blacked out without exposure field recognition being performed by image processing, but the range of radiation exposure must be set each time, and the burden on a technician when performing imaging is not reduced. Furthermore, there are also problems that it takes time and effort for a technician, efficiency is poor, and a patient is made to wait.

JP 2005-184750 A describes a system which performs appropriate image processing in accordance with an imaged site, but it does not utilize past trimming results and does not take into consideration automation of setting a range of exposure, and it does not reduce a burden on a technician when setting the range of radiation exposure.

An objective of the present invention is to provide a radiographic imaging system in which adjustment of a range of radiation exposure and trimming process are not required each time, and a burden on an imaging technician can be greatly reduced.

Another objective of the present invention is to provide a radiographic imaging system in which adjustment of a range of radiation exposure and trimming process are similarly not required each time, even when radiographic images are taken while the patient is tilted.

In order to attain the object described above, the present invention provides a radiographic imaging system comprising:

an imaging apparatus which irradiates radiation from a radiation source onto a subject, takes a radiographic image of the subject by detecting radiation that penetrated the subject by means of a radiation detector, and outputs image data of the radiographic image;

an image processing apparatus which performs image processing of at least one of an exposure field recognition process and a trimming process on the image data of the radiographic image taken by the imaging apparatus;

an image processing information storage apparatus which stores the imaging conditions of the radiographic image and image processing information which indicates the image processing performed by the image processing apparatus and its applicable range in an associated manner; and an image processing information search apparatus which searches for image processing information associated with imaging conditions of past imaging that match the imaging conditions of the current imaging, among the image processing information of the past imaging stored in the image processing information storage apparatus; wherein:

the imaging apparatus changes the range of radiation exposure irradiated from the radiation source in accordance with the applicable range of the image processing of the past imaging contained in the image processing information retrieved by the image processing information search apparatus.

The radiographic imaging system of the present invention stores the past imaging conditions and the image processing information in an associated manner, and if the imaging conditions of the current imaging match the imaging conditions of the past imaging, the current imaging is performed after the range of radiation exposure irradiated from the radiation source is changed in accordance with the applicable range of image processing of the past imaging contained in the retrieved image processing information of the past imaging. Therefore, a burden on an imaging technician can be greatly reduced because the range of radiation exposure does not have to be adjusted each time imaging is performed, and, depending on a case, trimming process is not required.

Also, according to the present invention, the trimmed region can be easily specified by a rectangular region whose sides extend in the horizontal direction and the vertical direction as in conventional methods, even in cases where radiographic images are taken while a patient is tilted. Additionally, in the actual trimming process, patient position alignment can be performed appropriately because neither the radiographic image nor the trimmed region is tilted. Also, because a virtual trimmed region which assumes that a patient is imaged straight on is used for optimization of the exposure field region, an optimal exposure field region can be approached more quickly.

BRIEF DESCRIPTION OF THE DRAWINGS

FIG. 1 is a block diagram of an embodiment showing a structure of a radiographic imaging system of the present invention.

FIG. 6 is a schematic drawing of an example showing a virtual actual trimmed region which assumes that a patient is imaged straight on.

DETAILED DESCRIPTION OF THE INVENTION

Figure 2A:
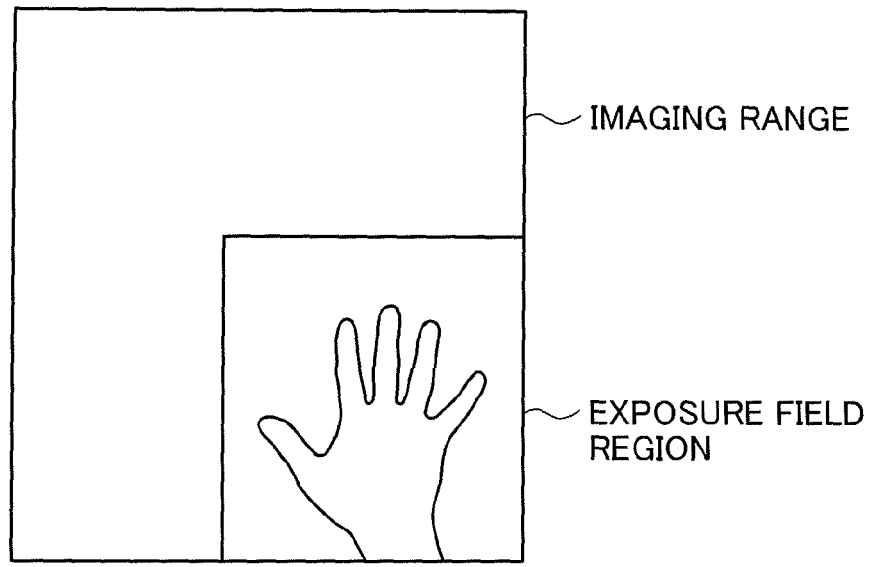
FIGS. 2A-2C are schematic drawings of an embodiment showing radiographic images of a palm of a hand of a patient.

A radiographic imaging system of the present invention is described in detail hereinafter based on a preferred embodiment shown in accompanying drawings.

FIG. 1 is a block diagram of an embodiment showing a structure of a radiographic imaging system of the present invention. The radiographic imaging system 10 shown in the drawing is constructed from an imaging apparatus 12, an image processing apparatus (console) 14, an image archiving apparatus (PACS) 16, an image diagnosis apparatus (viewer) 18, a diagnosis report apparatus 20, an image processing information storage apparatus 24 and an image processing information search apparatus 26. The apparatus are, for example, located in different locations in a hospital, and are connected to each other via a network. Although not mentioned in the descriptions below, various image data and various requests (request signals) are transmitted and received via the network.

The imaging apparatus 12 changes a range of radiation exposure irradiated from a radiation source in response to an exposure range change request of radiation input from the image processing apparatus 14, and then, in response to a radiographic image capture request similarly input from the image processing apparatus 14, it irradiates radiation from the radiation source onto a subject, and takes a radiographic image of the subject by detecting the radiation that penetrated the subject with a radiation detector, and outputs image data of the radiographic image. The image data of the radiographic image that is output from the imaging apparatus 12 is input into the image processing apparatus 14. Various configurations including a CR or a DR imaging apparatus, for example, can be used as the imaging apparatus 12.

Here, a CR imaging apparatus stores the radiation that penetrated the subject on an imaging plate (IP), and then scans the IP with a laser beam, reads out the photostimulated light emitted from the IP at that time, and obtains image data by computer processing.

Also, a DR imaging apparatus detects the radiation that penetrated the subject using a radiation detector such as a flat panel detector (FPD), and acquires digital image data of the radiographic image. A DR imaging apparatus may be of a fixed style wherein the FPD is built into a standing-position imaging table or a laying-position imaging table, or of a movable style wherein the FPD is housed in a cassette, which is mounted on the imaging apparatus when an image is taken.

Then, the image processing apparatus (console) 14, as described above, outputs a radiographic image capture request to the imaging apparatus 12, and from the imaging apparatus 12 it receives image data of the radiographic image (source image) of the object for which image capture was requested. The image processing apparatus 14 also performs image processing of at least one of exposure field recognition process and trimming process of the source image, and it outputs image data of a diagnostic image in which the region of concern (image region required for diagnosis by a physician) has been extracted, as well as the imaging conditions and image processing information corresponding to it. The image data of the diagnostic image is input into the image archiving apparatus 16, and the imaging conditions and the image processing information are input into the image processing information storage apparatus 24. The image processing apparatus 14 also outputs an image processing information search request and the imaging conditions as a search key to the image processing information search apparatus 26, and from the image processing information search apparatus 26 it receives the image processing information of past imaging corresponding to the image data of the radiographic image of the subject for which the search was requested. Additionally, the image processing apparatus 14 outputs a radiation exposure range change request and exposure range change information to the imaging apparatus 12. The radiation exposure range change request and the exposure range change information are input into the imaging apparatus 12.

Here, the exposure field recognition process is a process by which the image data of the image (exposure field recognition image) of the region exposed to radiation (radiation exposure field region) is automatically extracted from the image data of the source image. The present applicant has proposed various exposure field recognition processing methods, such as JP 10-071138 A, JP 10-143634 A, JP 10-162156 A, JP 10-275213 A and JP 10-248830 A. In the present invention, various exposure field recognition processes including the exposure field recognition processes disclosed in these publications may be used, and therefore detailed descriptions thereof are omitted.

The trimming process is a process by which the image data of an exposure field recognition image is trimmed, and the image data of the image (trimmed image) of the region of concern (trimmed region) is automatically extracted from the image data of the exposure field recognition image.

Imaging conditions express the various conditions when imaging is performed by the imaging apparatus 12. They include the patient ID (identification information) and the imaged site, as well as information such as imaging method (type of imaging apparatus and ID of imaging apparatus used in imaging), radiation dose and so forth.

Image processing information is information about image processing performed on the image data of a radiographic image by the image processing apparatus 14. In short, in this embodiment, it is information that expresses the contents of the exposure field recognition process and trimming process. Image processing information includes exposure field recognition information in the case where only the exposure field recognition process was performed by the image processing apparatus 14, trimming information in the case where only the trimming process was performed by the image processing apparatus 14, and information of both in the case where both processes were performed.

Exposure field recognition information includes an exposure field recognition flag which indicates whether or not the exposure field recognition process was implemented, and, if the exposure field recognition process was implemented, position information which expresses the image region recognized by the exposure field recognition process (applicable range of the exposure field recognition process) (for example, coordinates, size, outline, etc. of the exposure field recognition region).

Trimming information includes a trimming flag which indicates whether or not the trimming process was implemented, and, if the trimming process was implemented, position information which expresses the image region trimmed by the trimming process (applicable range of the trimming process) (for example, coordinates, size, outline, etc. of the trimmed region).

Exposure range change information is the information (position information which expresses the range of radiation exposure after the change, for example, the coordinates, size and outline of the range of exposure after the change) for changing (adjusting) the aperture of the collimator which restricts the range of radiation irradiated toward the subject from the radiation source in the imaging apparatus 12 when the radiographic image is taken.

The image archiving apparatus (PACS) 16 is an image database which stores image data of diagnostic images input from the image processing apparatus 14. In response to a diagnostic image delivery request (image request) input from the image diagnosis apparatus 18, the image archiving apparatus 16 delivers (outputs), to the image diagnosis apparatus 18, image data of diagnostic images of a subject specified by the image diagnosis apparatus 18 from among all stored image data of diagnostic images.

The image diagnosis apparatus (viewer) 18, as described above, outputs a diagnostic image delivery request to the image archiving apparatus 16, and from the image archiving apparatus 16, it receives the image data of the diagnostic images of the subject for which delivery was requested, and displays the diagnostic images corresponding to the received image data.

The diagnosis report apparatus 20 is used by the physician to enter (create) diagnosis reports which are the results of viewing diagnostic images. The diagnosis report apparatus 20 stores the diagnosis reports entered by physicians.

Note that the image diagnosis apparatus 18 and the diagnosis report apparatus 20 may be constructed separately as in this embodiment, but they may also be realized as one apparatus (for example, a personal computer, workstation, etc.).

The image processing information storage apparatus 24 stores the imaging conditions of the radiographic image input from the image processing apparatus 14 and the image processing information corresponding to it (that is, the image processing performed by the image processing apparatus and information about its applicable range) in an associated manner.

In response to an image processing information search request and imaging conditions as a search key input from the image processing apparatus 14, the image processing information search apparatus 26 searches for image processing information associated with imaging conditions of past imaging that match the imaging conditions of the current imaging (search key), among the image processing information of past imaging stored in the image processing information storage apparatus 24. Note that a plurality of image processing information that corresponds to the imaging conditions of the search key may be output, depending on the search. The image processing information corresponding to the imaging conditions of the search key is input into the image processing apparatus 14.

Note that in FIG. 1, the image processing information storage apparatus 24 and the image processing information search apparatus 26 are connected to the image processing apparatus 14, but they may also be connected on a network. The image processing information storage apparatus 24 may also be realized, for example, by an internal storage apparatus such as a hard disk of the image processing apparatus 14. The image processing information search apparatus 26 may also be realized, for example, by a computation function or program of the control apparatus of the image processing apparatus 14.

Next, the operation of the radiographic imaging system 10 will be described. In the descriptions below, after imaging is performed the first time, any image taken of the same site as the first time (palm of the hand) in a follow-up examination is considered to be the second time imaging is performed.

First, the operation when a radiographic image is taken for the first time will be described.

When imaging is performed the first time, a radiographic image capture instruction (for example, pressing of an imaging button), is input by an imaging technician into the image processing apparatus 14 via input means (not shown). As a result, the radiographic image capture request is output from the image processing apparatus 14.

As the imaging conditions of a radiographic image taken the first time, the imaging technician inputs the following conditions, for example, into the image processing apparatus 14 via the input means: Patient ID: A000; Imaged site: right hand; Imaging Method: DR; DR ID: 001; Radiation Dose: several dozen mAs. Note that radiation dose information may also be input into the image processing apparatus 14 from the imaging apparatus 12. The imaging conditions of the first time an image is taken are stored in the image processing apparatus 14.

In the imaging apparatus 12, when a radiographic image capture request is input from the image processing apparatus 14, a radiographic image of the subject is taken according to the imaging conditions. When imaging is complete, the image data of the captured radiographic image is output from the imaging apparatus 12.

In this embodiment, in the image processing apparatus 14, when the image data of the radiographic image is received from the imaging apparatus 12, the exposure field recognition process is performed on the image data of the radiographic image. Then, the trimmed region instructions (for example, coordinates, size; outline, etc. of the trimmed region) are input into the image processing apparatus 14 by the imaging technician via the input means. Based on these instructions, the trimming process is performed on the image data of the exposure field recognition image, and the image data of the diagnostic image is created in the image processing apparatus 14.

Here, as shown in FIG. 2, a radiographic image of the palm of the hand of a patient is given as an example.

FIG. 2A is a schematic drawing showing a radiographic image of the palm of the hand of the patient (source image). As shown in the drawing, the region exposed to radiation (exposure field region) is limited by changing the aperture of the collimator, for example, in the imaging apparatus 12. For this reason, in the source image, the regions in the exposure field region where no subject is present become solid black (entire black), and the regions in the imaging range other than the exposure field region become transparent (blank).

Figure 2B:
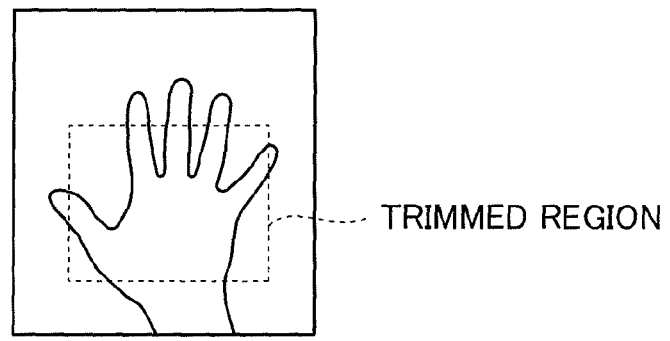
Figure 2C:
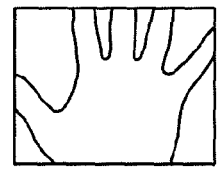

When the exposure field recognition process is performed on the source image by the image processing apparatus 14, only the image in the exposure field region (exposure field recognition image) is extracted from the source image, as shown in FIG. 2B. In addition, when the trimming process is performed on the exposure field recognition image, as shown in FIG. 2C, only the image in the region of concern (trimmed image) is extracted from the exposure field recognition image, and this becomes the diagnostic image.

When image processing by the image processing apparatus 14 is complete, the image data of the diagnostic image is output from the image processing apparatus 14. The image data of the diagnostic image is input and stored in the image archiving apparatus 16. Also, the imaging conditions and image processing information (exposure field recognition information and trimming information) are output from the image processing apparatus 14. The imaging conditions and image processing information are input into the image processing information storage apparatus 24, and are stored in an associated manner.

After the image data of the diagnostic image is stored in the image archiving apparatus 16, a diagnostic image delivery instruction is input into the image diagnosis apparatus 18 by the physician via an input means (not shown). As a result, a diagnostic image delivery request (image request) is output from the image diagnosis apparatus 18.

When a diagnostic image delivery request is input from the image diagnosis apparatus 18, the image archiving apparatus 16 searches for and outputs image data of diagnostic images of a subject specified by the image diagnosis apparatus 18, from among all stored image data of diagnostic images.

When the image diagnosis apparatus 18 receives image data of a diagnostic image of a subject for which delivery was requested from the image archiving apparatus 16, it displays the diagnostic image corresponding to the received image data.

When performing diagnosis, the physician (diagnostic image reader) performs diagnosis by looking at the diagnostic image displayed on the image diagnosis apparatus 18.

After diagnosis is finished, using the diagnosis report apparatus 20, the physician enters a diagnosis report which is the result of viewing the diagnostic images. The entered diagnosis report is stored in the diagnosis report apparatus 20.

Next, the operation when a radiographic image is taken the second time will be described.

When the second time imaging is performed, an image processing information search instruction and the imaging conditions of the search key are input by the imaging technician into the image processing apparatus 14 via the input means. As a result, the image processing information search request and imaging conditions of the search key are output from the image processing apparatus 14.

When the image processing information search instruction and the imaging conditions of the search key are input from the image processing apparatus 14, the image processing information search apparatus 26 searches for image processing information associated with imaging conditions that match the imaging conditions of the search key, among the image processing information of the past stored in the image processing information storage apparatus 24.

When the image processing apparatus 14 receives image processing information corresponding to the imaging conditions of the search key from the image processing information search apparatus 26, based on this image processing information it displays whether or not the exposure field recognition process and trimming process were performed, and, if processing was performed, it displays the image region for which that processing was performed. In this embodiment, the fact that both were performed is displayed. Then, an instruction to change the range of radiation exposure so as to result in a range from the applicable range of the exposure field recognition process to the applicable range of the trimming process, for example, is input into the image processing apparatus 14 by the imaging technician via the input means. As a result, an exposure range change request and exposure range change information are output from the image processing apparatus 14.

Figure 3:
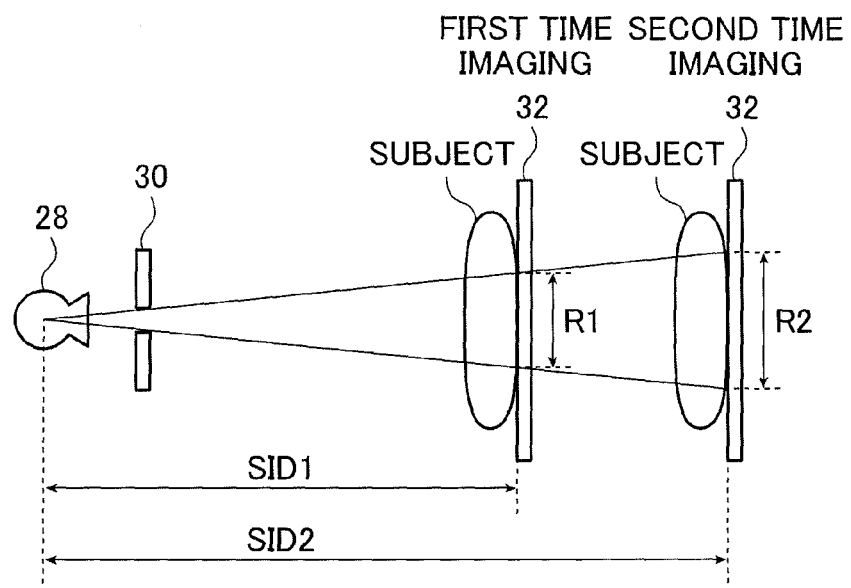
FIG. 3 is a schematic drawing of an embodiment showing a relationship between imaging distance and a range of radiation exposure on a radiation detector.

In the imaging apparatus 12, when the exposure range change request and exposure range change information are input from the image processing apparatus 14, as shown in FIG. 3, the range of radiation exposure irradiated from the radiation source 28 is changed such that the ranges of radiation exposure R1 and R2 on the radiation detector 32 become the range from the applicable range of the exposure field recognition process to the applicable range of the trimming process of when imaging was performed the first time, regardless of imaging distance, by adjusting the aperture of the collimator 30, for example, in accordance with the imaging distances SID1 and SID2 from the radiation source 28 to the radiation detector 32 and the exposure range change information.

As shown in FIG. 3, in the case where the imaging distance SID1 of when the image was taken the first time and the imaging distance SID2 of when the image was taken the second time are different, for example, even if the aperture of the collimator 30 is the same (that is, the range of radiation exposure irradiated from the radiation source 28 is the same), the ranges of radiation exposure R1 and R2 on the radiation detector 32 of when the image is taken the first time and the second time are different. Therefore, in order to change the range of radiation exposure on the radiation detector 32 such that it becomes the range from the applicable range of the exposure field recognition process to the applicable range of the trimming process of when imaged the first time, regardless of imaging distances SID1 and SID2, the first time and the second time imaging distances SID1 and SID2 must be the same, or the aperture of the collimator 30 must be adjusted while taking into consideration the difference between the first time and the second time imaging distances SID1 and SID2, for example.

Then, instead of radiation, the imaging technician exposes the subject to a light beam (visible light) via the aperture part of the collimator from an exposure field lamp, and the second time the subject is imaged, the imaging technician checks the range in which radiation is irradiated on the subject (range of radiation exposure on the radiation detector), and performs positioning such that the position of the subject when imaged the second time (position within the range of radiation exposure) matches the position of the subject when imaged the first time. After that, the second imaging is performed in the same way as the first imaging, and the image data of the captured radiographic image is output from the imaging apparatus 12.

Figure 4A:
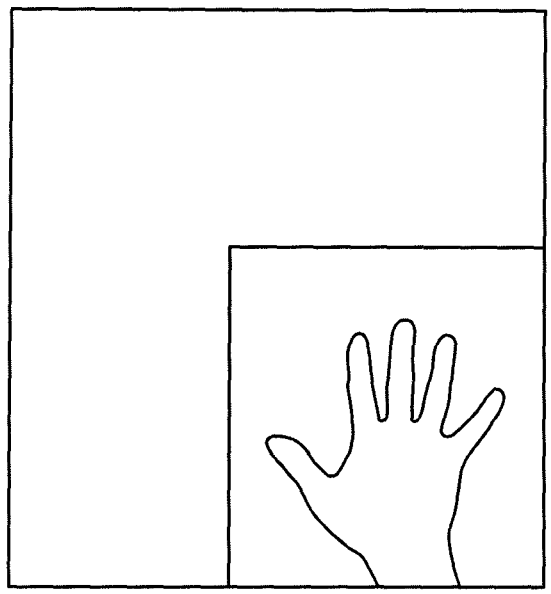
FIGS. 4A and 4B are schematic drawings of an embodiment showing an arrangement of a subject on a radiation detector.
Figure 4B:
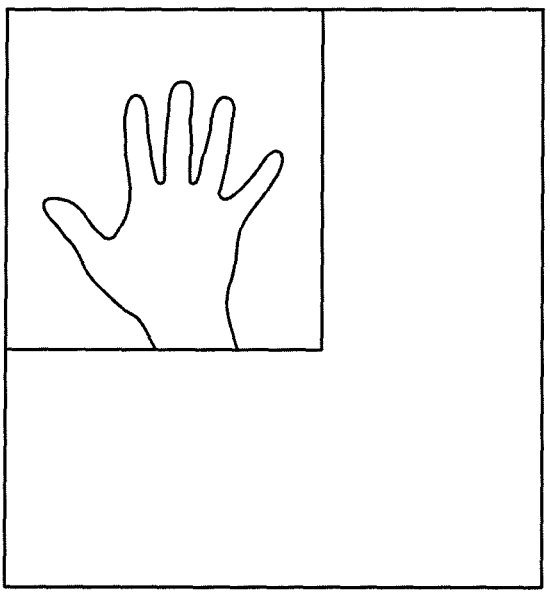

For example, if the position of the subject when imaged the first time is on the lower right of the radiation detector (that is, the captured radiographic image) as shown in FIG. 4A, and it is on the upper left as shown in FIG. 4B when imaged the second time, then, in order to align the position of the subject when imaged the second time with the position of the subject when imaged the first time, the position of the subject when imaged the second time is moved to the same position of the subject as when imaged the first time, or the range of radiation exposure is moved such that the position of the subject when imaged the second time (position within the range of radiation exposure) is the same as the position of the subject when imaged the first time (position within the range of radiation exposure).

In this embodiment, in the image processing apparatus 14, when the image data of the radiographic image is received from the imaging apparatus 12, the exposure field recognition process is performed on the image data of the radiographic image, and image data of the diagnostic image is thereby created.

As described above, the range of radiation exposure in the radiographic image taken the second time is changed so that it is the range between the applicable range of the exposure field recognition process and the applicable range of the trimming process of the first time the image was taken. As the range of radiation exposure approaches the applicable range of the trimming process, the size of the exposure field recognition image approaches the size of the trimmed image taken the first time. In short, if the range of radiation exposure is close to the applicable range of the trimming process of when the image was taken the first time, the trimming process is unnecessary because an image of the same size as the trimmed image of when the image was taken the first time can be obtained simply by performing the exposure field recognition process.

As described above, the radiographic imaging system 10 stores imaging conditions and image processing information of the first time imaging in an associated manner, and if the imaging conditions of the second time imaging match the imaging conditions of the first time imaging, the second time imaging is performed after the range of radiation exposure irradiated from the radiation source is changed in accordance with the applicable range of image processing of the past imaging contained in the retrieved image processing information of the first imaging. Therefore, the burden on the imaging technician can be greatly reduced because the range of radiation exposure does not have to be adjusted each time imaging is performed, and, depending on the case, trimming process is not required.

Note that, in the image processing apparatus 14 when imaging is performed the first time, and, if only the exposure field recognition process was performed, in the imaging apparatus 12 when imaging is performed the second time, the range of radiation exposure irradiated from the radiation source is changed such that the range of radiation exposure on the radiation detector is the applicable range of the exposure field recognition process of the first time imaging, regardless of imaging distance. On the other hand, if only the trimming process was performed, when the second time imaging is performed, the range of radiation exposure irradiated from the radiation source is changed such that the range of radiation exposure on the radiation detector is the applicable range of the trimming process of the first time imaging, regardless of imaging distance.

Also, if the imaging conditions of the second time imaging match the imaging conditions of the first time imaging, imaging the second time may be performed without changing the range of radiation exposure, and the applicable range of image processing in past imaging contained in the retrieved image processing information of the first time imaging may be used as the initial region of the trimmed region in the case where trimming process was performed on the image data of the radiographic image taken the second time.

When trimming process is performed by the image processing apparatus 14, the initial region of the trimmed region is determined by first determining the broad region where trimming is to be performed, and then determining the final trimmed region where fine adjustment is to be performed. Thus, as described above, the trimming process can be performed efficiently by determining the initial region of the trimmed region of when trimming process is performed, in accordance with the applicable range of image processing of past imaging.

The present invention may be similarly applied when imaging is performed the third time and thereafter. Also, when imaging is performed the third time and thereafter, the reuse conditions of image processing information (conditions for storing image processing information) can be set in finer detail. For example, only the trimming process results that are deemed more appropriate in later evaluation may be reused, or the image processing information having the most recent date among a plurality of image processing information corresponding to the same search key may be used, or the average of a predetermined number of pieces of image processing information of the past may be used.

Next, the trimming process in the case where a radiographic image was taken with the imaged site of the patient tilted will be described.

The description below is an example of the case where the information of applicable range of the trimming process of when imaging was performed a previous time is used in the exposure field region of the current imaging, in the case where a radiographic image of a certain imaging session of the past, such as the previous session, was taken with the imaged site of the patient tilted.

As described above, the radiographic imaging system 10 uses the information of applicable range of the trimming process of past imaging in the exposure field region of the current imaging, and through learning by performing this repeatedly, it approaches the optimal exposure field region.

However, as described above, due to the fact that the previous radiographic image was taken with the patient tilted, the exposure field region will be far from the optimal region if the information of applicable range of the trimming process, which was changed exceptionally only the previous time imaging was performed such that the trimmed region became large, is used in the current imaging. Therefore, it is not desirable to use the information of applicable range of this type of exceptional trimming process as is.

Normally, as shown in FIG. 2B, the trimming process is performed by specifying a rectangular region (trimmed region) whose sides extend in the horizontal direction and the vertical direction in the radiographic image, and extracting the image data of the image of this trimmed region. In the radiographic imaging system 10, the coordinate information of the trimmed region of when imaging was performed in the past is used in the exposure field range of the current imaging, and positioning is performed such that the patient's position in the current imaging matches the patient's positions in past imaging.

As described above, if, for example, the previous radiographic image was taken with the patient tilted, one may consider rotating the previous radiographic image in the direction opposite the tilt of the patient and thereby correcting the tilt, and implementing the trimming process on the radiographic image after correction. Or, one may consider specifying the trimmed region by tilting it in the direction of tilt of the previous radiographic image.

However, when positioning the patient for the current imaging, if the angle of the trimmed region of the previous imaging and the angle of the exposure field region of the current imaging are not equal, it is not possible to performing positioning to begin with. Therefore, as described above, if the trimmed region is determined by tilting the radiographic image or the trimmed region when performing the trimming process of the previous radiographic image, it is not possible to appropriately position the patient for the current imaging.

Thus, in the radiographic imaging system 10, the trimming process is performed as described below in the imaging processing apparatus 14 in the case where the previous radiographic image was taken with the patient tilted.

Figure 7A:
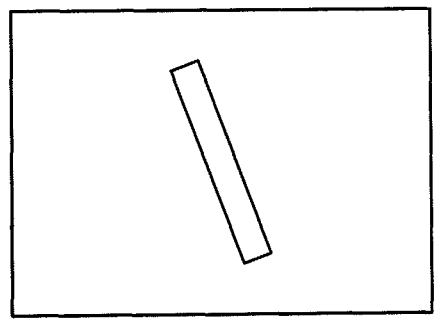
FIGS. 7A, 7B and 7C are schematic drawings of an example showing a flow in a case where a trimming process is performed on a radiographic image taken with a patient tilted.
Figure 7B:
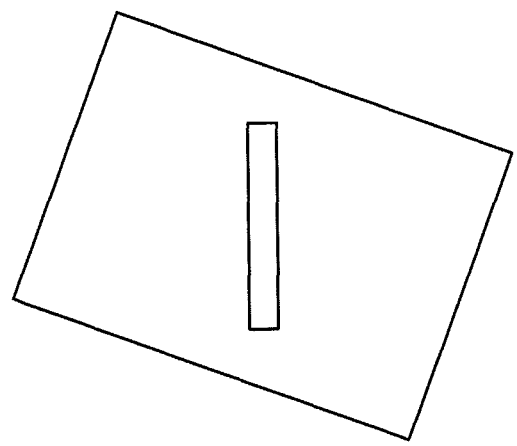
Figure 7C:
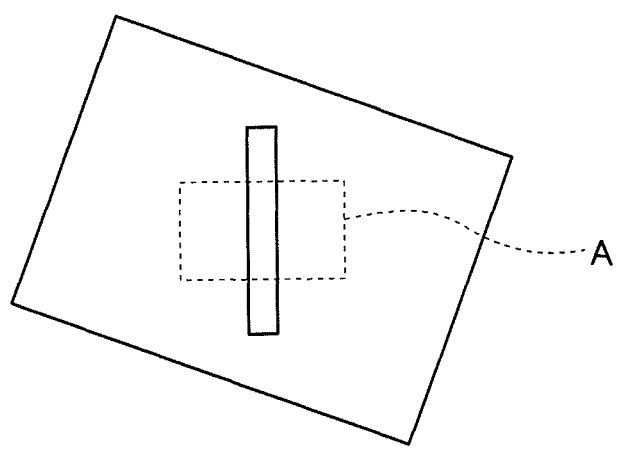
Figure 8A:
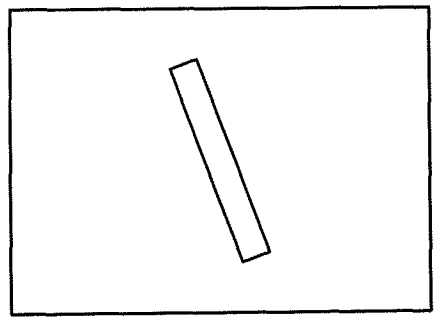
FIGS. 8A, 8B and 8C are schematic drawings of another example showing a flow in a case where a trimming process is performed on a radiographic image taken with a patient tilted.
Figure 8B:
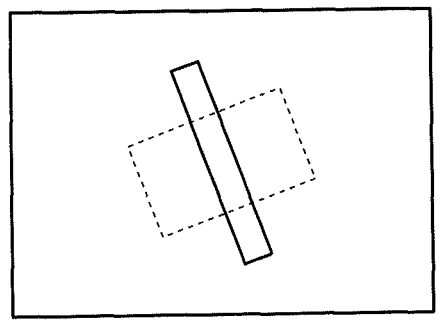
Figure 8C:
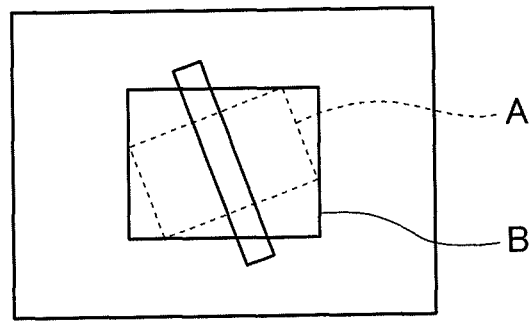

In the case where the previous radiographic image was taken with the patient tilted (refer to FIG. 7A), the radiographic image is first rotated in the direction opposite the tilt of the patient, and the tilt is thereby corrected (refer to FIG. 7B) and displayed. Then, the imaging technician specifies the trimmed region for the radiographic image after correction (after rotation) (refer to FIG. 7C). In the corrected radiographic image, since the tilt of the patient has been corrected, the trimmed region is specified as in conventional methods by a rectangular region whose sides extend in the horizontal direction and the vertical direction (dotted line A of FIG. 7C).

Here, when the trimmed region is specified for the corrected radiographic image, it is preferred that, for example, a radiographic image taken before the previous time is displayed in parallel, and the imaging technician can specify the trimmed region while looking at it. By so doing, the tilt of the patient can be corrected accurately. Note that if the radiographic image is taken substantially accurately aside from the rotation angle, the rotation process can be performed automatically by aligning the outline positions of the previous radiographic image and the radiographic image taken before that.

Figure 5:
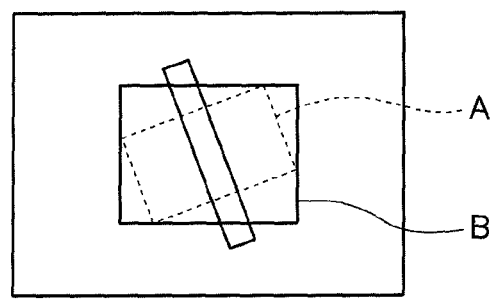
FIG. 5 is a schematic drawing of an example showing an actual trimmed region and a diagnostic image region in a radiographic image taken with a patient tilted.

Then, the coordinate information of the rectangular region (actual trimmed region) in the radiographic image before correction (that is, the previous radiographic image) corresponding to the coordinate information of the trimmed region in the radiographic image after correction is calculated, in accordance with the rotation angle information and trimmed region coordinate information (coordinates of one vertex and height and width, or coordinates of two diagonal vertices) in the radiographic image after correction. As shown by dotted line A in FIG. 5, the rectangular region in the radiographic image before correction is the rectangular region tilted (rotated) by the angle corresponding to the tilt of the patient.

The actual trimming process is performed on the radiographic image before correction in accordance with the coordinate information of the rectangular region in the radiographic image before correction, that is, the coordinate information of the actual trimmed region, and the image data of the diagnostic image is output from the image processing apparatus 14. As described above, the actual trimmed region is the rectangular region tilted at an angle corresponding to the tilt of the patient, but, as shown by solid line B in FIG. 5, the diagnostic image is the smallest rectangular region image that includes the actual trimmed region and whose sides extend in the horizontal direction and the vertical direction.

Also, imaging conditions and image processing information (including the rotation angle information in the radiographic image after correction and the coordinate information of the actual trimmed region in the radiographic image before correction) are output from the image processing apparatus 14, and they are stored in an associated manner in the image processing information storage apparatus 24.

Figure 6:
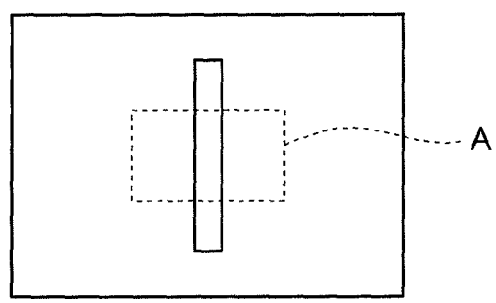

On the other hand, when the current imaging is performed, when the information of applicable range of the trimmed region of the previous imaging is used in the exposure field range of the current imaging, the coordinate information of a virtual rectangular region (virtual trimmed region) which assumes that the image of the patient is taken straight on, corresponding to the actual trimmed region, is determined by rotating the actual trimmed region, as shown by dotted line A in FIG. 6, in accordance with the coordinate information of the actual trimmed region in the radiographic image before correction and the rotation angle information in the radiographic image after correction contained in the image processing information retrieved by the image processing information search apparatus 26. In the imaging apparatus 12, the exposure field region of the current imaging is changed, using the coordinate information of this virtual trimmed region as the applicable range of the trimming process for the previous radiographic image.

In the radiographic imaging system 10, there is the advantage that image quality is not degraded, because the radiographic image before correction on which the actual trimming process is performed is not rotated. Also, the trimmed region can be easily specified by a rectangular region whose sides extend in the horizontal direction and the vertical direction as in conventional methods, using the radiographic image after correction (that is, the radiographic image for display for specifying the trimmed region). Additionally, in the actual trimming process, patient position alignment can be performed appropriately because neither the radiographic image nor the trimmed region is tilted.

As described above, if a radiographic image has been taken with the patient tilted, it is preferred that the information of applicable range of the trimming process, which is exceptionally large, is discarded without being used. In contrast, in this embodiment, even if an image was taken with the patient tilted, by determining the information of applicable range of the virtual trimming process which assumes that the patient was imaged straight on, it can be used to optimize the exposure field region, and as a result, the optimal exposure field region can be approached more quickly.

Note that, as image processing information, rotation angle information in the radiographic image after correction and coordinate information of the trimmed region can be stored, and the coordinate information of the actual trimmed region in the radiographic image before correction corresponding to them can be determined.

In this case, when the current imaging is performed, when the information of applicable range of the trimmed region of the previous imaging is used in the exposure field range of the current imaging, the coordinate information of a virtual rectangular region (virtual trimmed region) which assumes that the radiographic image before correction of the patient is taken straight on corresponding to the coordinate information of the trimmed region is determined in accordance with the coordinate information of the trimmed region and the rotation angle information in the radiographic image after correction contained in the image processing information retrieved by the image processing information search apparatus 26. In the imaging apparatus 12, the exposure field region of the current imaging is changed, using the coordinate information of this virtual trimmed region as the applicable range of the trimming process for the previous radiographic image.

Also, if radiographic images are taken in succession with the patient tilted, for example, if taken two or more times in succession, this is considered to be a fixed tilt. In this case, as described above, the smallest rectangular region that includes the actual trimmed region in the radiographic image before correction and whose sides extend in the horizontal direction and the vertical direction is calculated, and the calculated smallest rectangular region can be considered to be the trimmed region of the previous imaging, and can be used in the exposure field region of the current imaging.

If one considers degradation of image quality due to the rotation process and the difficulty of performing the trimming process on a radiographic image taken with the patient tilted, one may think that implementing the trimming process at a tilt is undesirable. For example, as disclosed in JP 2002-368975 A, when imaging a rod-shaped subject, if the situation is such that the image must be rotated and trimmed after being taken, it is thought to be more efficient if the image is taken after the subject is first rotated.

On the other hand, one may also consider the fact that, in order to reduce the size of the image as a whole, it is preferable to rotate it in a direction different from the orientation of when the image is taken and to record that, as disclosed in the above publication. In this case, it should be permissible to perform the trimming process at a tilt.

For example, if the trimming process was implemented at a tilt, it may be thought that the orientation of the patient or the radiation detector was inappropriate at the outset when imaging was performed, and one may consider displaying a message that urges the imaging technician to pay attention to orientation when imaging is currently performed under the same conditions. On the other hand, if there are a plurality of instances of trimming at a tilt, it may be thought that it was fixed in the tilted state for some reason, and therefore, one may also consider not displaying a message to pay attention if certain conditions are satisfied.

For example, one may consider keeping the trimming coordinates for each image, and displaying a warning message if there are less than N % tilted ones among the images of the same conditions.

As imaging conditions, rather than patient ID, information such as body type (heavy/slender, large/small, etc.) age classification (infant/child/adult or classification by actual age), body characteristics, diagnosing physician name, medical facility name, imaging distance, model application (selected from a preset menu, etc.), symptoms and so forth can also be used. In particular, since the size of each site of the subject depends on body type, it is useful to use the information of the body type and the imaged site as the imaging conditions. Also, if patient ID is not used as an imaging condition, it is possible to use image processing information of the same site of the same body type of another subject rather than the same subject. Similarly, the size of each site of a subject strongly depends on age classification. Judgment by age is an effective means of quantitative classification by body characteristics with a certain degree of accuracy. Also, if patient ID is not used as an imaging condition, it is possible to use image processing information of the same site of the same age classification regardless of subject.

The image processing information storage apparatus 24 may be a local server (it can be used in the facilities only) which can be used only within facilities at which a radiographic imaging system 10 is installed, such as a plurality of hospitals affiliated with a hospital or medical association, or a server (it can be used in all over the world) on a global network. It is also possible to configure it such that information stored locally can be later sent out to a network. By so doing, image processing information of the past can be utilized from other facilities only when necessary. In this case it is also possible to charge an information access fee in accordance with certain conditions.

It is also possible to automatically set the exposure range of radiation of the current imaging using the image processing information of past imaging, and then to make fine adjustments in the range of exposure by manipulations performed by the imaging technician. For example, this is useful in cases where image processing information was judged to be optimal the previous time imaging was performed, but the range of radiation exposure that is automatically set based on the previous image processing information is judged not to be optimal the current time imaging was performed, or in cases where a long time has elapsed since the previous imaging was performed and the body type of the patient has changed.

The image processing information storage apparatus 24 may be configured so as to automatically store all image processing information input from the image processing apparatus 14, for example, but it may also be configured such that it stores only the image processing information selected by the imaging technician via input means in the image processing apparatus 14. For example, reliability of stored data can be increased by not storing image processing data when imaging was performed with an inappropriate range of exposure, or when imaging failed or the trimming process failed.

It may also be configured such that the range of radiation exposure is changed using information of images for which imaging failed or the trimming process failed. For example, if it is judged that imaging failed due to body movement, the range of exposure may be changed using the image processing information of the immediately previous image in which imaging did not fail. Also, if an image is re-taken immediately after imaging failed, the range of exposure may be changed using the image processing information of the imaging performed immediately prior, without searching for image processing information of past imaging. In addition, it may also be configured such that if trimming failed, the range of exposure is not changed using the image processing information of the previous imaging.

It may also be configured such that, if imaging is performed repeatedly in succession with the same range of radiation exposure as the previous imaging (repeat imaging, tomosynthesis imaging, etc.), the image processing information search apparatus 26 does not search for image processing information of past imaging, and the imaging apparatus 12 uses the range of radiation exposure irradiated from the radiation source at the time of the first imaging of the successive repeated imaging.

It may also be configured such that, when no image processing information of past imaging is stored in the image processing information storage apparatus 24, pre-imaging (pre-shot) is implemented by the imaging apparatus 12 with a radiation dose weaker than when normal imaging is performed, in order to change the range of radiation exposure to an appropriate range, and the image data of the pre-shot radiographic image is output, and then, in the image processing apparatus 14, image processing is performed on the image data of the pre-shot radiographic image, and the range of radiation exposure irradiated from the radiation source is changed using the resulting image processing information.

It may further comprise an image processing information correction apparatus which corrects the image process information of past imaging depending on various parameters, and it may further comprise a warning display apparatus which displays warnings. For example, a warning display apparatus may display a warning such as "Patient physique may have changed. Please check that the range of exposure is appropriate." in the case where a patient who was 10 years old when imaged the previous time is imaged one year later.

Also, restrictions may be provided, such as not using the image processing information of past imaging to change the range of radiation exposure even if it is image processing information with the same exposure conditions such as patient ID or imaged site, if the implementation date of the past imaging was more than a predetermined number of years before, for example.

The present invention is basically as described above.

The present invention, as described above in detail, is not limited in any manner to the above embodiments, and various improvements and modifications may be made without departing from the spirit of the invention.

What is claimed is:

1. A radiographic imaging system comprising:
an imaging apparatus which irradiates radiation from a radiation source onto a subject, takes a radiographic image of said subject by detecting radiation that penetrated said subject by means of a radiation detector, and outputs image data of said radiographic image;
an image processing apparatus which performs image processing of at least one of an exposure field recognition process and a trimming process on the image data of the radiographic image taken by said imaging apparatus;
an image processing information storage apparatus which stores the imaging conditions of said radiographic image and image processing information which indicates the image processing performed by said image processing apparatus and its applicable range in an associated manner; and
an image processing information search apparatus which searches for image processing information associated with imaging conditions of past imaging that match the imaging conditions of the current imaging, among the image processing information of the past imaging stored in said image processing information storage apparatus; wherein:
said imaging apparatus changes the range of radiation exposure irradiated from said radiation source in accordance with the applicable range of the image processing of the past imaging contained in the image processing information retrieved by said image processing information search apparatus.

2. The radiographic imaging system according to claim 1, wherein:
in a case where only the exposure field recognition process was performed on the image data of said radiographic image by said image processing apparatus, said imaging apparatus changes the range of radiation exposure irradiated from said radiation source such that the range of radiation exposure on said radiation detector becomes the applicable range of the exposure field recognition process of the past imaging contained in the image processing information retrieved by said image processing information search apparatus, regardless of imaging distance.

3. The radiographic imaging system according to claim 1, wherein:
in a case where only the trimming process was performed on the image data of said radiographic image by said image processing apparatus, said imaging apparatus changes the range of radiation exposure irradiated from said radiation source such that the range of radiation exposure on said radiation detector becomes the applicable range of the trimming process of the past imaging contained in the image processing information retrieved by said image processing information search apparatus, regardless of imaging distance.

4. The radiographic imaging system according to claim 1, wherein:
in a case where both the exposure field recognition process and the trimming process were performed on the image data of said radiographic image by said image processing apparatus, said imaging apparatus changes the range of radiation exposure irradiated from said radiation source such that the range of radiation exposure on said radiation detector becomes a range from the applicable range of the exposure field recognition process to the applicable range of the trimming process of the past imaging contained in the image processing information retrieved by said image processing information search apparatus, regardless of imaging distance.

5. The radiographic imaging system according to claims 1, wherein:
said imaging apparatus changes the range of radiation exposure irradiated from said radiation source by adjusting an aperture of a collimator in accordance with the applicable range of the image processing of the past imaging contained in the image processing information retrieved by said image processing information search apparatus.

6. The radiographic imaging system according to claims 1, wherein:
the applicable range of said image processing includes information of a coordinates or an outline of an image region to which said image processing is applied.

7. The radiographic imaging system according to claims 1, wherein:
said imaging conditions include information of subject ID and imaged site; and
said image processing information search apparatus retrieves image processing information of a same imaged site of a same subject from among said image processing information of the past imaging.

8. The radiographic imaging system according to claims 1, wherein:
said imaging conditions include information of body type and imaged site; and
said image processing information search apparatus retrieves image processing information of a same imaged site of a same body type from among said image processing information of the past imaging.

9. The radiographic imaging system according to claims 1, wherein:
said imaging conditions include information of age classification and imaged site; and
said image processing information search apparatus retrieves image processing information of a same imaged site of a same age classification from among said image processing information of the past imaging.

10. The radiographic imaging system according to claims 1, wherein:
said image processing information storage apparatus stores only the imaging conditions and image processing information selected in said image processing apparatus.

11. The radiographic imaging system according to claims 1, wherein:
in a case where a plurality of image processing information were retrieved, said image processing information search apparatus outputs image processing information having a most recent date among said retrieved plurality of image processing information.

12. The radiographic imaging system according to claims 1, wherein:
in a case where a plurality of image processing information were retrieved, said image processing information search apparatus outputs an average of a predetermined number of pieces of image processing information from among said retrieved plurality of image processing information.

13. The radiographic imaging system according to claims 1, wherein;
in a case where imaging is performed repeatedly in succession with a same range of radiation exposure as previous imaging, said imaging apparatus uses the range of radiation exposure irradiated from said radiation source at a time of a first imaging of said imaging performed repeatedly in succession.

14. The radiographic imaging system according to claims 1, wherein:
in a case where no said image processing information is stored in said image processing information storage apparatus, said imaging apparatus implements pre-imaging before said current imaging, and outputs image data of a radiographic image of said pre-imaging;
said image processing apparatus performs said image processing on said image data of the radiographic image of the pre-imaging; and
said imaging apparatus changes the range of radiation exposure irradiated from said radiation source in accordance with image processing information which indicates the image processing performed by said image processing apparatus on the image data of the radiographic image of the pre-imaging and its applicable range.

15. The radiographic imaging system according to claims 1, further comprising a warning display apparatus which displays a warning in cases where image processing information for which a predetermined time has elapsed since imaging is output as the image processing information corresponding to the imaging conditions of said current imaging.

16. The radiographic imaging system according to claims 1, wherein said image processing information search apparatus does not output image processing information for which a predetermined time has elapsed since imaging, even if it is image processing information corresponding to the imaging conditions of said current imaging.

17. The radiographic imaging system according to claim 1, wherein:
in a case where the subject in the radiographic image of a certain imaging session of past is imaged at a tilt with respect to the subject in a same position in a radiographic image taken earlier, said image processing apparatus corrects the tilt of said subject by rotating the radiographic image of said certain imaging session, and outputs image processing information which includes rotation angle information in the radiographic image after correction and coordinate information of a first trimmed region whose sides extend in a horizontal direction and a vertical direction specified for said radiographic image after correction.

18. The radiographic imaging system according to claim 17, wherein:
when the current imaging is performed, said image processing apparatus determines coordinate information of a virtual rectangular region which assumes that the subject was imaged straight on in the radiographic image of said certain imaging session, corresponding to said first trimmed region, in accordance with the coordinate information of said first trimmed region and said rotation angle information contained in the image processing information retrieved by said image processing information search apparatus; and
said imaging apparatus changes the range of radiation exposure irradiated from said radiation source using the coordinate information of said virtual rectangular region as the applicable range of said image processing.

19. The radiographic imaging system according to claim 1, wherein:
in a case where the subject in a radiographic image of a certain imaging session of past is imaged at a tilt with respect to the subject in a same position in a radiographic image taken earlier, said image processing apparatus corrects the tilt of said subject by rotating the radiographic image of said certain imaging session, and determines coordinate information of a second trimmed region in the radiographic image of said certain imaging session, corresponding to coordinate information of a first trimmed region, in accordance with rotation angle information in the radiographic image after correction and the coordinate information of said first trimmed region whose sides extend in a horizontal direction and a vertical direction, specified for the radiographic image after correction, and outputs image processing information that includes said rotation angle information and said coordinate information of the second trimmed region.

20. The radiographic imaging system according to claim 19, wherein:
when the current imaging is performed, said imaging apparatus determines coordinate information of a virtual rectangular region which assumes that the subject was imaged straight on in the radiographic image of said certain imaging session, corresponding to said second trimmed region, in accordance with the coordinate information of said second trimmed region and said rotation angle information contained in the image processing information retrieved by said image processing information search apparatus; and
said imaging apparatus changes the range of radiation exposure irradiated from said radiation source using the coordinate information of said virtual rectangular region as the applicable range of said image processing.

* * * * *